C. ROBERTS.
Wheel Cultivator.

No. 37,009. Patented Nov. 25, 1862.

Witnesses:
J. Snowden Bell
George A Schaffer

Inventor:
Cyrus Roberts
by his Attorney
Wm. D. Baldwin

UNITED STATES PATENT OFFICE.

CYRUS ROBERTS, OF THREE RIVERS, MICHIGAN.

IMPROVEMENT IN CULTIVATORS.

Specification forming part of Letters Patent No. 37,009, dated November 25, 1862.

*To all whom it may concern:*

Be it known that I, CYRUS ROBERTS, of Three Rivers, in the county of St. Joseph and State of Michigan, have invented certain new and useful Improvements in Cultivators, of which the following is a full, clear, and exact description, reference being had to the accompanying drawings, which make part of this specification, and in which—

Figure 1:
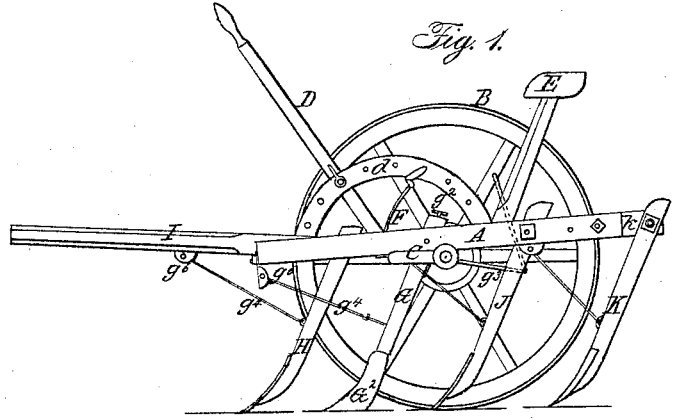
Figure 2:
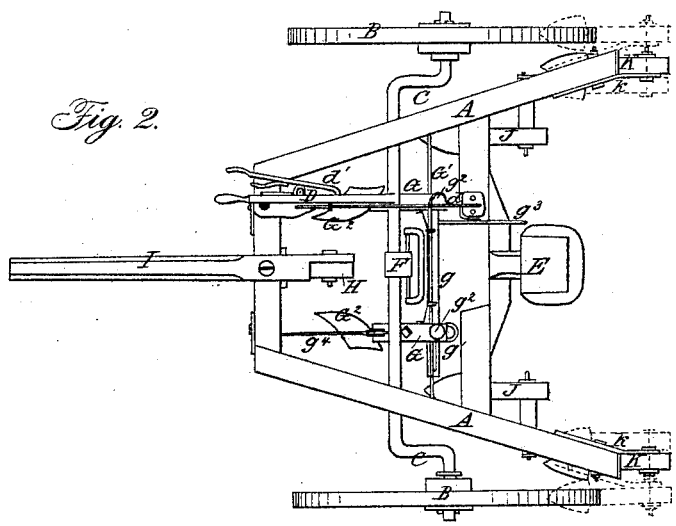
Figure 3:
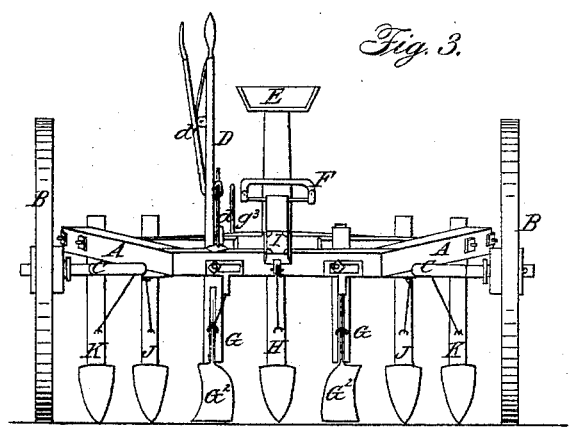

Figure 1 represents a view in elevation of one side of a cultivator embracing my improvements, with the rear wheel removed in order to show the parts more clearly. Fig. 2 represents a plan or top view of the same with the wheel in place. Fig. 3 represents a view in elevation of the same as seen from the front.

My invention relates more especially to that class of cultivators in which the wheels are mounted upon a crank-axle in order to raise and lower the machine; and the improvements claimed under this patent consist in combining with the driver's seat both a foot-lever and a hand-lever, each so arranged that the driver may from his seat readily grasp the one and bear upon the other in order more easily to adjust the machine, as hereinafter described; secondly, in terminating the side pieces of the frame just back of the wheels and attaching each of the hindmost outside teeth or feet to a removable projecting arm secured to the side piece in such manner that their distance apart can readily be regulated, and they can also be made to run directly in the track of the wheels, whereby the wheels are prevented from traveling in the dead furrows, and other advantages are attained, as hereinafter specified.

In the accompanying drawings, which represent a convenient arrangement of parts for carrying out the objects of my invention, a stout frame, A, is shown as supported by two wheels, B, mounted on a crank-axle, C, which turns in suitable bearings underneath the frame. A hand-lever, D, is firmly secured to this axle in a position where it can readily be reached by the driver from his seat E. The lever can be held in any desired position (and consequently the frame at any elevation desired) by means of a spring-bolt, $d'$, upon the lever-handle, which detent takes into a curved rack, $d$, secured upon the frame. A foot-lever, F, is also secured to the axle C in such manner that the driver from his seat can readily bear upon the lever with his whole weight in order to raise the machine. By this means, instead of having to lift his own weight in addition to that of the machine, as has heretofore been the case in machines having a crank-axle, the driver is enabled to employ his own weight in a very advantageous manner in raising the frame. The legs G in this instance are secured upon a bar or frame, $g$, capable of sliding freely on a bar or rod, $G'$, arranged transversely across the frame. A lever or rod, $g^3$, is secured to the frame $g$ and extends backward to a point where it can readily be reached by the driver in order to traverse the feet from side to side. Mold-boards $G^2$ are attached to the leg G. They may be reversed, when desired, in order to throw the earth either to or from the row, as desired. In fallow ground spades similar to the others may be substituted for the mold-boards.

One end of a stay-rod or chain, $g^4$, is attached to each of the legs by a swiveling joint, while the other is secured to an adjustable or swiveling bracket, $g^6$, on the frame by means of a wooden pin. When an obstacle is encountered this pin breaks and permits the teeth to turn on their pivots, and thus escape damage.

A foot, H, is attached to the rear end of the tongue I, but is always removed when working corn. Two other feet, J, are secured to blocks or arms projecting from the inner sides of the frame. The hind feet, K, are each attached to an arm, $k$, which is secured to the frame by bolts and nuts, that it may readily be removed or replaced. The side pieces of the frame, it will be observed, terminate at a point just back of the wheels, as shown in Figs. 1 and 2 of the drawings.

The above-described mode of attaching the two hind feet to the frame is very convenient for marking out corn-ground. For instance, in a full-sized machine, when both the feet are on the inside of their respective arms and the arms fastened to the inner sides of the frame, as shown by the blue lines in Fig. 2, they will mark a distance between them of three and one half feet; by placing them both outside the arms, as shown in the black lines of that figure, they will mark four feet; by placing the arms outside the frame and the legs inside the arms, they will mark four and one-half feet; and, finally, by placing both arms and legs outside the frame, as shown by the red lines, will mark five feet. In this latter position it will be seen that these feet run directly in the track of the wheels. This is a great advantage in working the machine, as it prevents the wheel from running in the dead furrow on its return.

By cutting off the rear ends of the side pieces of the frame, as heretofore used, and substituting the removable projecting arms $k$, I am also enabled to bring the wheels closer to the frame, and thus to diminish the length of the axle, and consequently the distance between the wheels, each and all of which advantages will readily be appreciated by the practical mechanic and by the farmer. By arranging a majority of the teeth in rear of the axle I am moreover enabled to avoid any tendency to drag down the front of the frame, which would bear heavily upon the team, and thus to relieve their necks from the strain to which they would be subjected were it not for this arrangement.

It is deemed unnecessary here to describe in detail the construction and arrangement of the other parts of the machine, as such details form no part of the subject-matter herein claimed, and are, moreover, fully described in another application for Letters Patent filed simultaneously with this, and marked B.

What I claim under this application as my invention is—

1. The combination of a foot-lever, hand-lever, and crank-axle with a driver's seat, when arranged for joint operation substantially in the manner described, for the purpose set forth.

2. The combination of the hind feet, K, with the removable projecting arms $k$, when arranged and operating substantially as and for the purposes described.

In testimony whereof I have hereunto subscribed my name.

CYRUS ROBERTS.

Witnesses:
R. J. MORRISON,
WM. F. ARNOLD.